US010069687B2

(12) United States Patent
Piccinini et al.

(10) Patent No.: US 10,069,687 B2
(45) Date of Patent: Sep. 4, 2018

(54) CONFIGURATION MODULE FOR AUTOMATICALLY CONFIGURING THE COMMUNICATION CAPABILITIES OF AN INTELLIGENT ELECTRONIC DEVICE

(75) Inventors: Giuseppe Piccinini, Pedrengo (IT); Marzio Grassi, Pontirolo Nuovo (IT); Diego Pagnoncelli, Madone (IT)

(73) Assignee: ABB Schweiz AG, Baden (CH)

( * ) Notice: Subject to any disclaimer, the term of this patent is extended or adjusted under 35 U.S.C. 154(b) by 590 days.

(21) Appl. No.: 14/404,290

(22) PCT Filed: Jun. 7, 2012

(86) PCT No.: PCT/EP2012/060827
§ 371 (c)(1),
(2), (4) Date: Nov. 26, 2014

(87) PCT Pub. No.: WO2013/182244
PCT Pub. Date: Dec. 12, 2013

(65) Prior Publication Data
US 2015/0172124 A1  Jun. 18, 2015

(51) Int. Cl.
*B60L 1/00* (2006.01)
*H04L 12/24* (2006.01)
*H02J 13/00* (2006.01)

(52) U.S. Cl.
CPC .......... *H04L 41/0886* (2013.01); *H02J 13/00* (2013.01); *H04L 41/0816* (2013.01);
(Continued)

(58) Field of Classification Search
CPC .. H02J 13/00; H04L 41/0816; H04L 41/0853; H04L 41/0886; H04L 41/12;
(Continued)

(56) References Cited

U.S. PATENT DOCUMENTS

2010/0325304 A1* 12/2010 Wimmer ................. H04L 67/12
                                                            709/232
2014/0304403 A1* 10/2014 Hadeli ................... H04L 41/145
                                                            709/224

FOREIGN PATENT DOCUMENTS

CN     101490647 A     7/2009
CN     101931231 A     12/2010
(Continued)

OTHER PUBLICATIONS

European Patent Office: International Search Report for International Application No. PCT/EP2012/060827, dated Sep. 14, 2012, dated Sep. 25, 2012.
(Continued)

*Primary Examiner* — Rexford Barnie
*Assistant Examiner* — Elim Ortiz
(74) *Attorney, Agent, or Firm* — Patterson Intellectual Property Law, P.C.; Gary L. Montle

(57) ABSTRACT

A configuration module for automatically configuring the communication capabilities of an Intelligent Electronic Device of a Substation Automation system for an electric power distribution network. The configuration module comprises: —first computerized means configured to obtain first data indicative of the logical power/data flow between said Intelligent Electronic Device and one or more further Intelligent Electronic Devices; —second computerized means configured to generate a configuration description file for said Intelligent Electronic Device on the base of said first data, said configuration description file comprising a communication description data set including information, which has been generated on the base of said first data to describe the logical power/data flow between said Intelligent Electronic Device and said further Intelligent Electronic Devices; —third computerized means configured to store said configuration description file in said Intelligent Electronic Device, so that said configuration description file is used by said Intelligent Electronic Device in substitution of a previously existing configuration description file.

31 Claims, 8 Drawing Sheets

Figure 1:
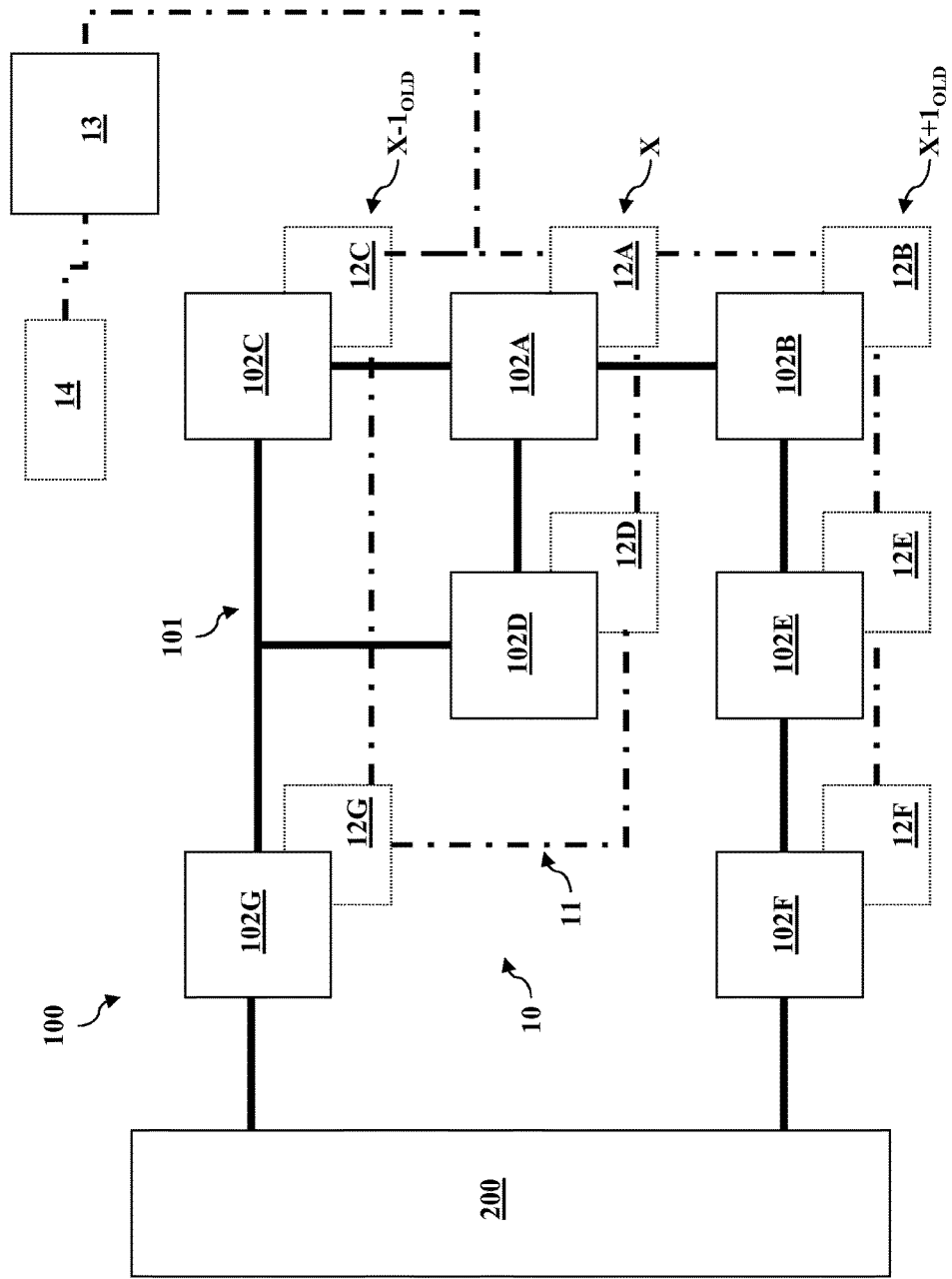

(52) U.S. Cl.
CPC .......... *H04L 41/0853* (2013.01); *H04L 41/12* (2013.01); *H04L 41/0246* (2013.01); *Y04S 40/162* (2013.01); *Y04S 40/164* (2013.01); *Y10T 307/25* (2015.04)

(58) Field of Classification Search
CPC .. H04L 41/0246; Y04S 40/162; Y04S 40/164; Y10T 307/25
USPC ........................................................ 307/104
See application file for complete search history.

(56) References Cited

FOREIGN PATENT DOCUMENTS

| EP | 2264967 | | 12/2010 |
|---|---|---|---|
| EP | 2264967 | A1 | 12/2010 |
| EP | 2362577 | | 8/2011 |
| EP | 2398128 | A2 | 12/2011 |
| WO | 2008011618 | A2 | 1/2008 |

OTHER PUBLICATIONS

"IEC 61850-6. Communication networks and systems in substations—Part 6: Configuration description language for communication in electrical substations related to IEDs", Jan. 1, 2004 (Jan. 1, 2004), pp. 1-150, XP55000963, Retrieved from the Internet: URL: [retrieved on Jun. 20, 2011] Sections 4-7, Section 9.4.

Hossenlopp L: "Engineering perspectives on IEC 61850", IEEE Power and Energy Magazine, IEEE., Piscataway, NJ, US, vol. 5, No. 3, May 1, 2007 (May 1, 2007), pp. 45-50, XP011379410, ISSN: 1540-7977, DOI: 10.1109/MPAE.2007.365819 the whole document.

State Intellectual Property Office of the People's Republic of China: Notification of First Office Action for Application No. 201280073802.4, dated Feb. 19, 2017.

European Patent Office: Communication Pursuant to Article 94(3) EPC for Application No. 12 728 432.1-1853 dated Jun. 13, 2017.

\* cited by examiner

CONFIGURATION MODULE FOR AUTOMATICALLY CONFIGURING THE COMMUNICATION CAPABILITIES OF AN INTELLIGENT ELECTRONIC DEVICE

The present invention relates to the field of Substation Automation systems for electric power distribution networks.

More particularly, the present invention relates to a configuration module for automatically configuring the communication capabilities of an Intelligent Electronic Device of a Substation automation system for a low or medium voltage electric power distribution network.

Within the framework of the present invention the term "low voltage" relates to voltages lower than 1 kV AC and 1.5 kV DC while the term "medium voltage" relates to voltages lower than 72 kV AC and 100 kV DC.

As is known, an electric power distribution network comprises a variety of so-called "primary devices", such as transformers, reactors, capacitor banks, circuit breakers, disconnector switches, and the like.

Said primary devices are operated by a Substation Automation (SA) system, which comprises a variety of "secondary devices" configured to manage the operation of said primary devices.

A typical example of said secondary devices is represented by the so-called Intelligent Electronic Devices (IED).

These electronic devices are configured to perform protection, control and/or monitoring functions on one or more primary devices of the power distribution network. They may comprise relay devices, load tap changer controllers, circuit breaker controllers, capacitor bank switches, recloser controllers, voltage regulators, and the like.

Typically, each IED is provided with a control unit including a microprocessor, which is capable of performing several protection, metering, monitoring and control functions concurrently.

A SA system may also comprise other types of secondary devices, e.g. automation devices, which provide connectivity functionalities between the IEDs and higher-level control systems, or automation devices for coordinating the operations of the IEDs.

The secondary devices of a SA system can communicate one another via a communication network that may comprise one or more communication buses at different levels, for example one or more process level buses, bay level and station level buses.

A variety of protocols exists for managing communication in SA systems, which includes many proprietary communication protocols.

A standard for communication between the secondary devices of a SA system has been introduced by the IEC 61850 regulation.

For vertical communication messages, IEC 61850 standard provides a communication protocol called "Manufacturing Message Specification (MMS)" protocol, which is substantially based on a Transmission Control Protocol (TCP) and Internet Protocol (IP) protocol.

For horizontal event-based messages, IEC 61850 standard provides a communication protocol called "Generic Object Oriented Substation Events (GOOSE)" protocol.

According to this communication protocol, transmitted data are embedded in Ethernet data packages and are distributed as peer to peer multicast or broadcast messages.

Data packages are basically transmitted using a publisher-subscriber mechanism. Each secondary device is thus enabled to receive the messages sent by selected publishers, i.e. by selected secondary devices, which are identified in a MAC (Media Access Control) address list stored in the memory of said secondary device. On the other hand, the messages sent by each secondary device are received only by selected subscribers, i.e. by selected secondary devices having their MAC address comprised in a MAC address list of the secondary device.

For multicast transmission of data related to very fast periodically changing signals through the communication network (e.g. data related to measured analogue voltages or currents), IEC 61850 specifies the Sampled Value (SV) service protocol, according to which transmitted data are embedded in Ethernet data packages as for the GOOSE protocol.

IEC 61850 foresees that the functionalities of each IED of the SA system are described by means of a standard System Configuration description Language (SCL), based on XML.

The information describing the functionalities of an IED are collected in a configuration description file (SCL file), which is stored in a memory of the IED during the operating life of this latter.

In general, the SCL file of an IED comprises information describing the functionalities executed by the IED in the SA process.

The SCL file comprises a communication description data set, which includes information describing the communication capabilities of the IED.

In particular, the communication description data set includes information describing the logical power/data flow between the IED and the further IEDs of the SA system.

The communication description data set may comprise other data, such as for example, the MAC address lists to be used for the transmission/reception of GOOSE data packages, data related to the GOOSE massaging traffic, and the like.

As is known, a common SA system function is to try to isolate a fault in the power distribution network as soon as possible (typically in the range of ms), so as to avoid a protection intervention of the primary substation that feeds the power distribution network.

A fault event in the power distribution network is thus treated by the SA system as a time-critical event.

GOOSE messaging between the IEDs is therefore generally adopted to coordinate protection interventions by the IEDs.

Nonetheless, a SA system is configured to coordinate the protection interventions of the IEDs so as to avoid unnecessary service interruptions of sections of the power distribution network that are not affected by the fault event.

Thus, an IED is enabled to intervene for isolating a fault (e.g. for commanding a circuit breaker to interrupt the current flowing along a section of the power distribution network) only if it doesn't receive blocking/consent messages from the adjacent IEDs and/or the primary devices, according to the logical power/data flow, in particular from the IEDs that are immediately positioned upstream and downstream in the logical power/data flow between the IEDs.

Current SA systems have proven to be quite effective in limiting the propagation of service interruptions subsequent to a fault event in the power distribution network.

Nonetheless, relevant drawbacks have to be evidenced, which are basically linked to poor capabilities in managing possible changes in the logical configuration of the communication network.

If the logical power/data flow between the IEDs remains unchanged in time, the described fault management model works properly, since an IED can always distinguish the consent messages transmitted by the adjacent IEDs on the base of the information stored in the communication description data set of its own SCL file.

If the logical configuration of the communication network is modified for some reasons, an IED will no more be able to acknowledge its closest adjacent IEDs.

Any change in the logical configuration of the communication network thus requires that the communication description data set of the SCL files of the IEDs, which are affected by said change, is updated.

Changes in the logical configuration of the communication network are typically determined by modifications of the topology of the power distribution network Unfortunately, power distribution networks are generally subject to a huge number of topology changes during their operating life. As an example, a relatively extended power distribution network may be subject to more than 200 topology changes per year.

As a consequence, the re-configuration or update activities of the communication capabilities of the IEDs typically entail relevant maintenance costs for the SA system, since, currently, the re-configuration of the SCL file of an IED requires an on-the-field intervention on a skilled technician.

In the market it is quite felt the demand for technical solutions capable of solving, at least partially, the drawbacks mentioned above.

In order to respond to this need, the present invention provides a configuration module for automatically configuring the communication capabilities of an IED, according to the following claim 1 and the related dependent claims.

In a general definition, the configuration module, according to the invention, is characterised by the fact of comprising:
  first computerized means configured to obtain first data indicative of the configuration of the logical power/data flow between the IED and one or more further IEDs that communicate with said IED through the communication network of the SA system;
  second computerized means configured to generate a configuration description file for the IED on the base of said first data, said configuration description file comprising a communication description data set including information, which has been generated on the base of said first data to describe the logical power/data flow between said IED and the further IEDs connected to the communication network;
  third computerized means configured to store said configuration file in said IED, so that said configuration description file is used by said Intelligent Electronic Device in substitution of a previously existing configuration description file.

The configuration module, according to the invention, is particularly suitable for re-configuring the communication capabilities of an IED, subsequent to a change in the logical configuration of the communication network, in particular subsequent to a change in the physical layout of the power distribution network.

The configuration module, according to the invention, is preferably embedded in the IEDs of the SA system but it may be also embedded in other secondary devices of the SA system.

Preferably, the configuration module, according to the invention, is a computer program product, which is stored or uploaded in a memory of the IED (and/or in a memory of other secondary devices depending on where the program has to embedded) and which is executed by a digital processing device of this latter.

Alternatively, the configuration module, according to the invention, may be a physical device that is operatively associated or integrated in the control unit of an IED (and/or associated or integrated in the control unit of another secondary device).

Figure 2:
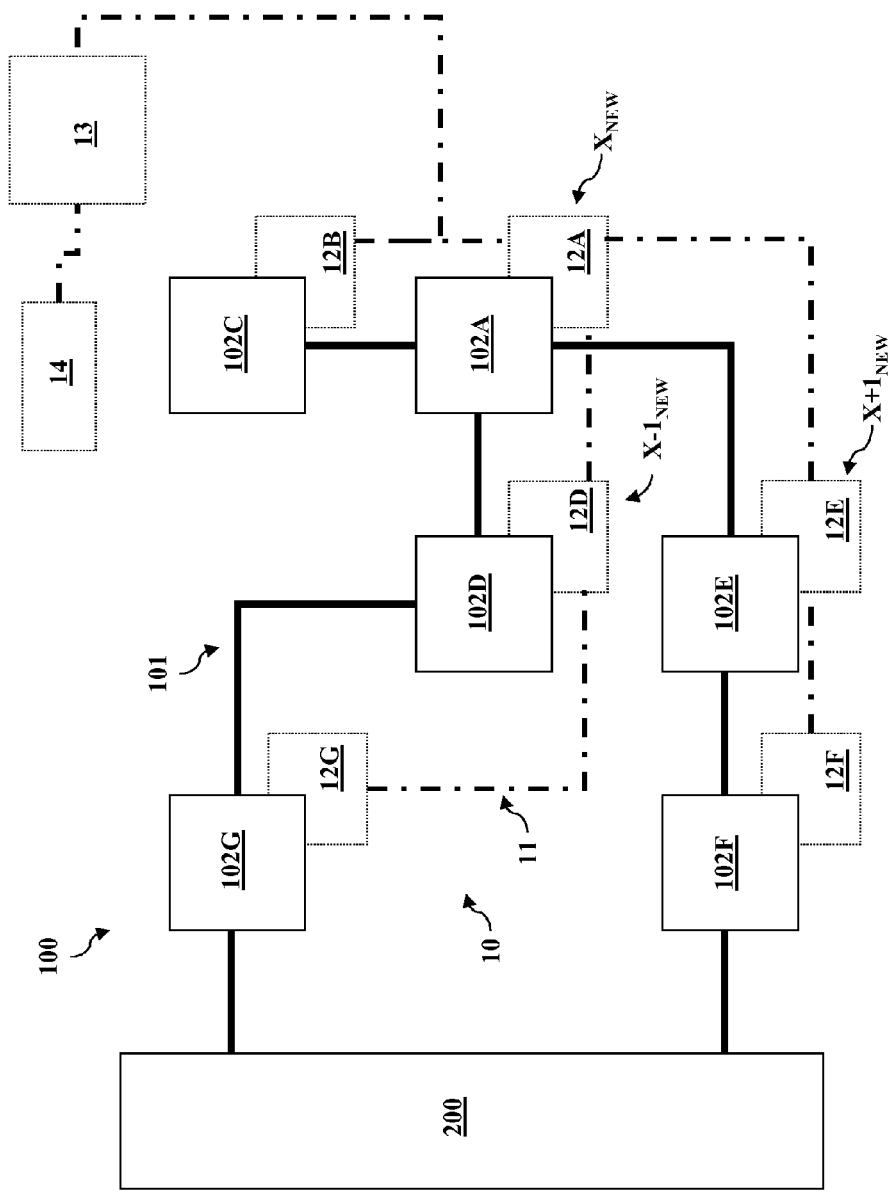
Figure 3:
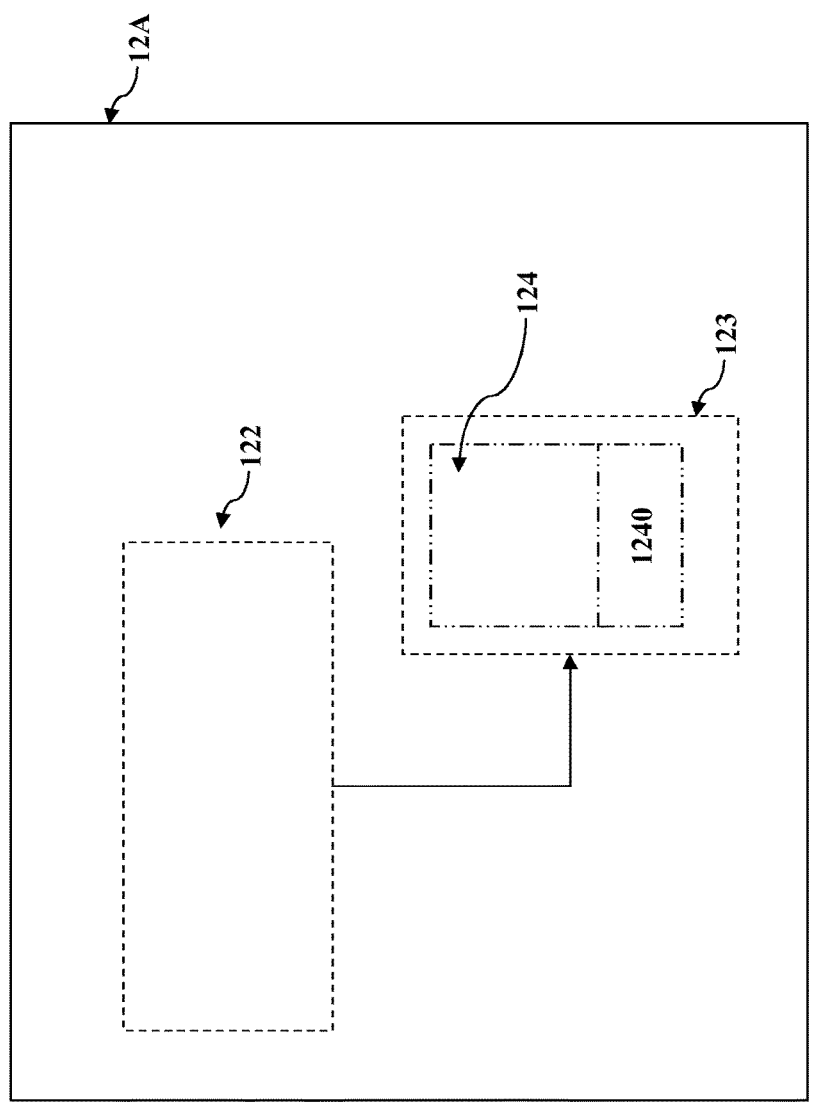
Figure 4:
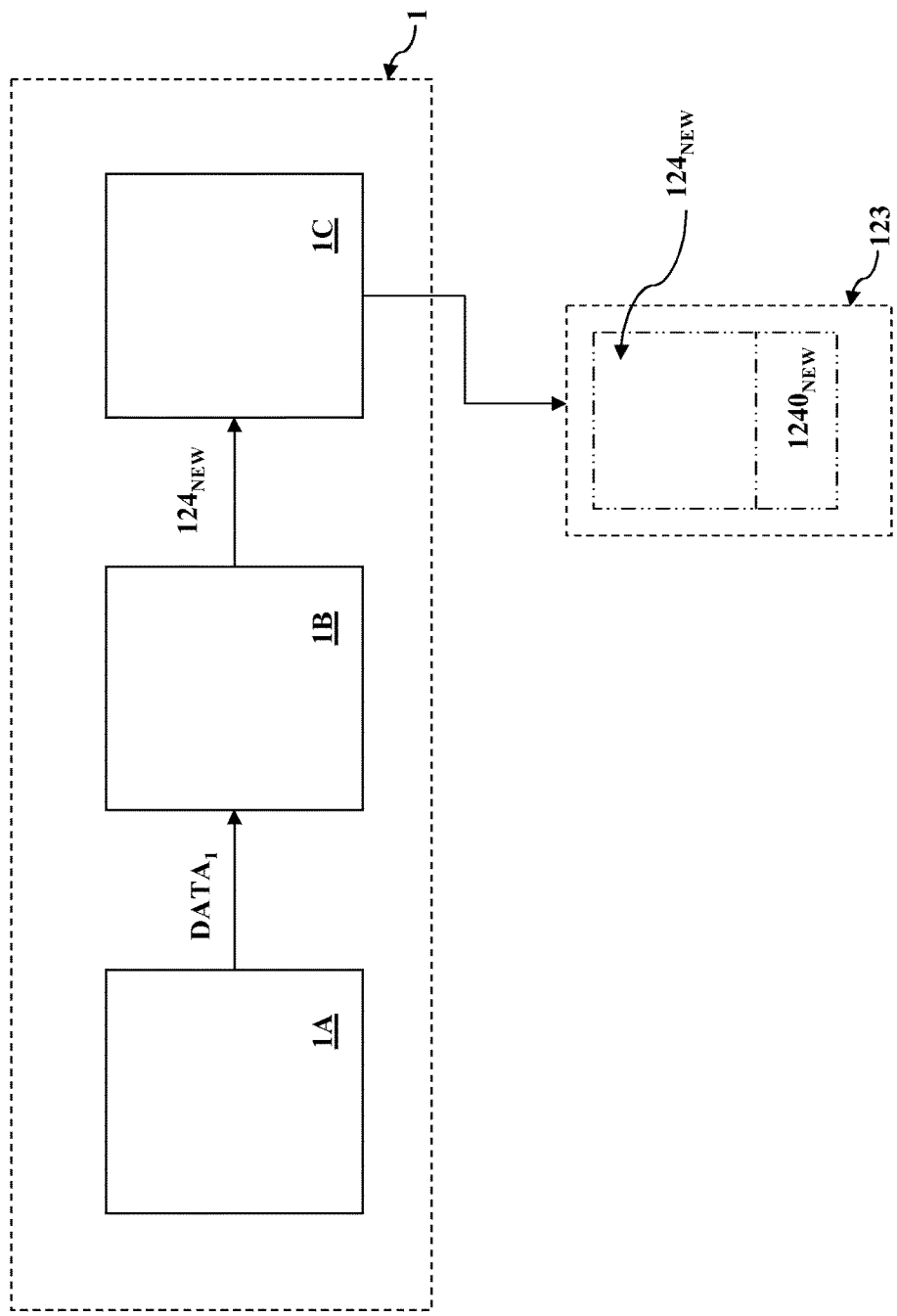
Figure 5:
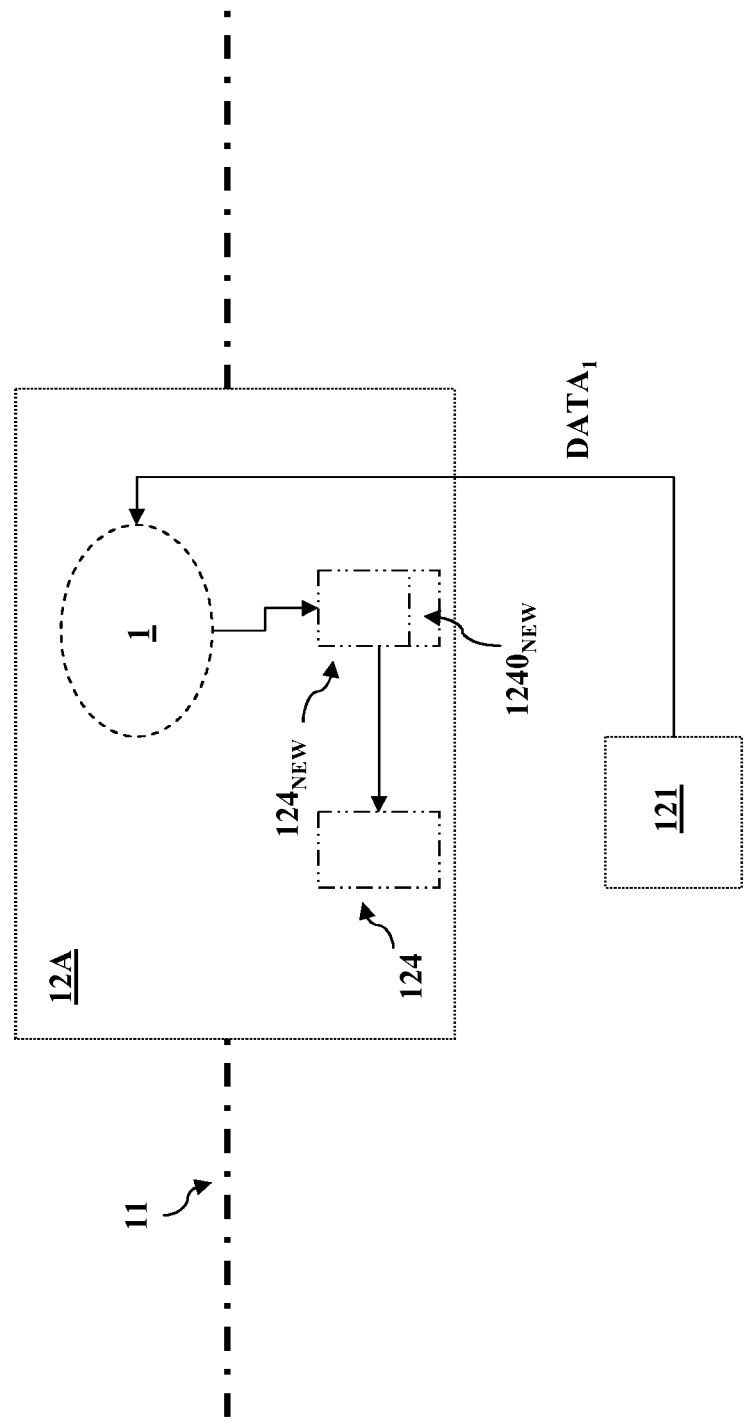
Figure 6:
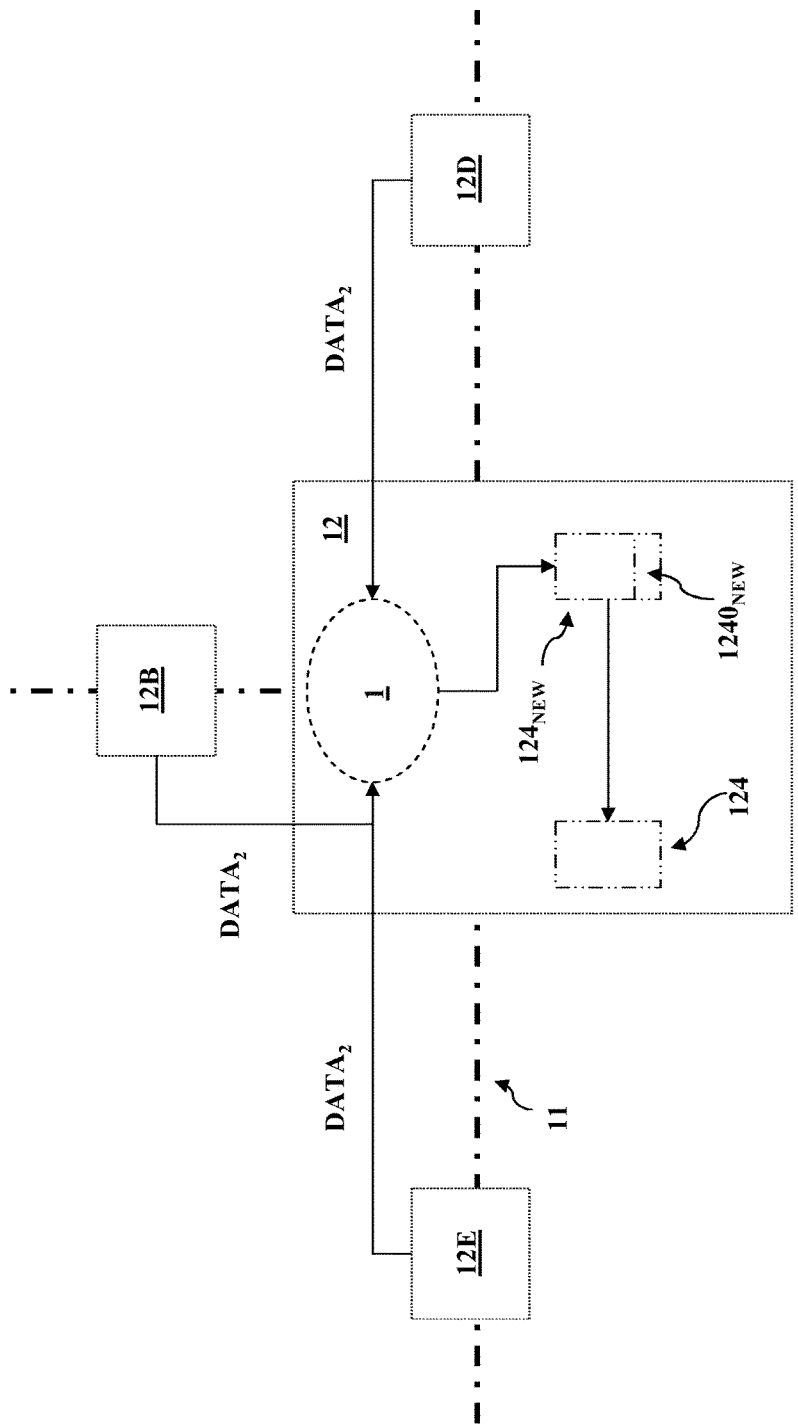
Figure 7:
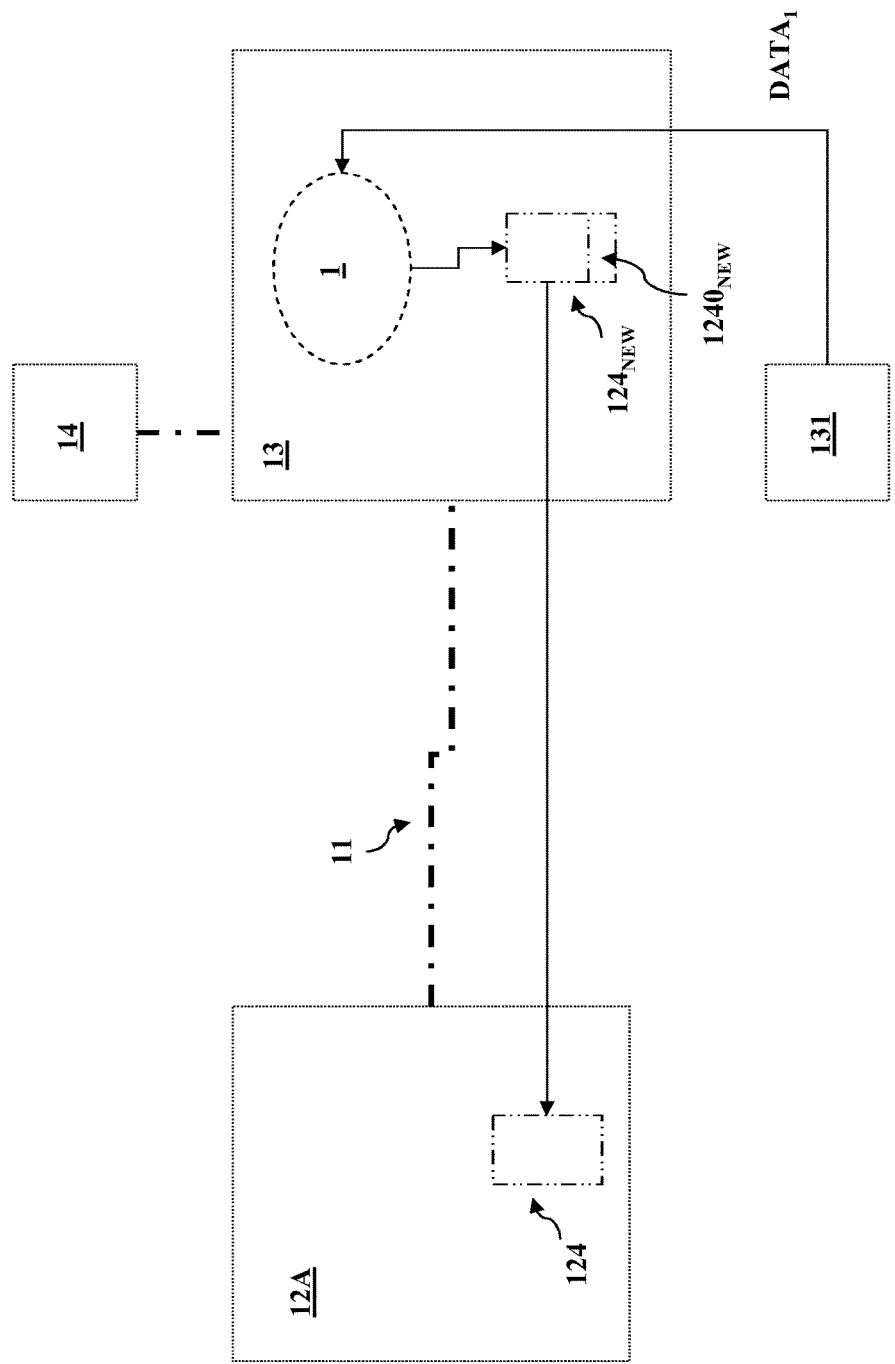
Figure 8:
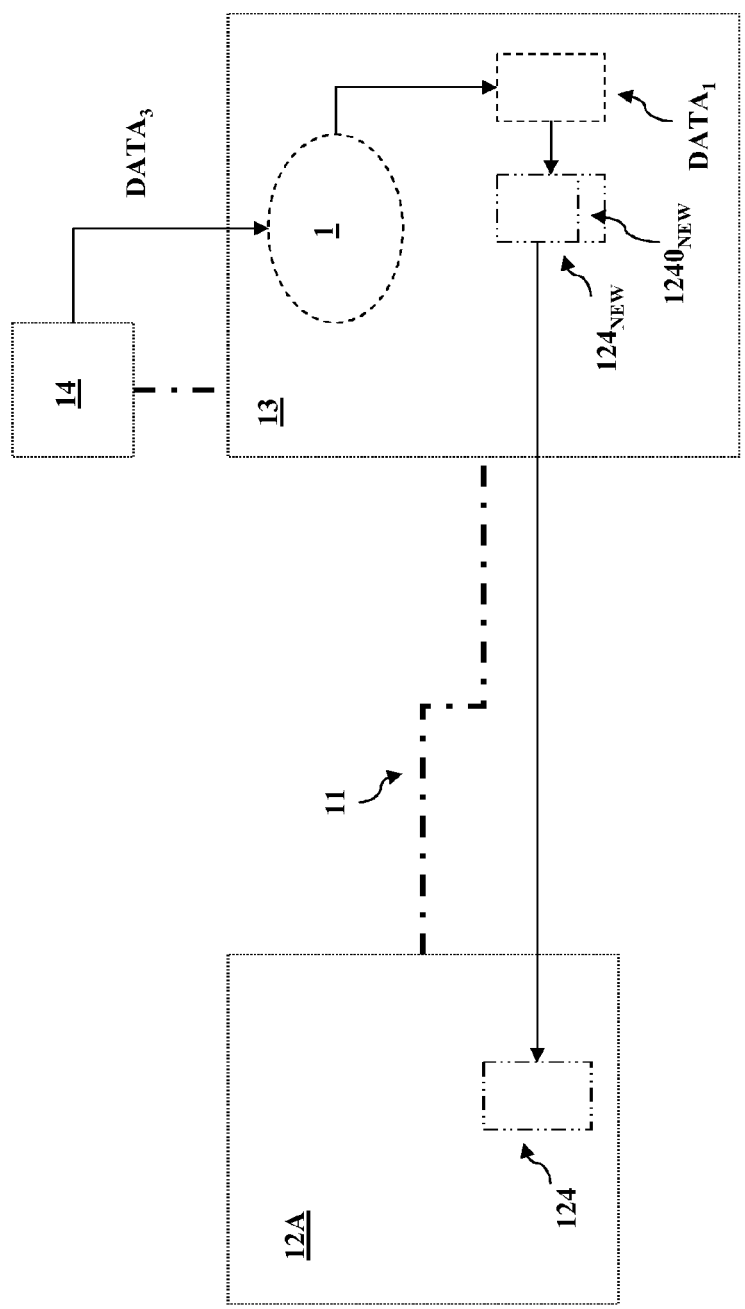

Further characteristics and advantages of the present invention will become more apparent from the detailed description of preferred embodiments illustrated only by way of non-limitative example in the accompanying drawings, in which:

FIG. 1-2 are block diagrams that schematically illustrate a power distribution network having two different physical layouts; and FIG. 3 is a block diagram that schematically illustrates an Intelligent Electronic Device; and FIG. 4 is a block diagram that schematically illustrates the configuration module, according to the invention; and FIGS. 5-8 are block diagrams that schematically illustrate the operation of the configuration module, according to the present invention.

Referring to the cited figures, the present invention refers to a configuration module 1 for automatically configuring the communication capabilities of an IED 12A of a SA system 10 for a low or medium voltage electric power distribution network 100.

The power distribution network 100 comprises primary devices 102A, 102B, 102C, 102D, 102E, 102F, 102G that are fed or operatively connected by power conductors 101.

The power distribution network 100 is advantageously fed by one or more primary substations 200, e.g. one or more power generation utilities or power transmission networks.

The SA system 10 comprises a plurality of secondary electronic devices that advantageously includes the IED 12A and the further IEDs 12B, 12C, 12D, 12E, 12F, 12G, which are operatively associated to the primary devices 102A-102G.

The SA system 10 preferably comprises also at least an automation device 13.

The automation device 13 may be any automation device configured to provide automation functionalities for implementing the automation process carried out by the SA system 10.

For example, the automation device 13 may be a control platform capable of providing communication gateway, control and/or user-interface functionalities or may be a control server configured to provide control/coordination functionalities of the IEDs 12A-12G.

The SA system 10 comprises also a communication network 11, which preferably comprises one or more communication buses forming an Ethernet LAN (Local Area Network) or a WAN (Wide Area Network).

The IEDs 12A-12G are connected by the communication network 11 and are configured so as to be capable of mutually communicating through this latter.

The IED 12A is thus advantageously capable of exchanging data packages with any of the further IEDs 12B-12G through the communication network 11.

The exchange of data packages occurs according to the logical configuration of the communication network 11, in particular according to the logical power/data flow between the IED 12A and the further IEDs 12B-12G.

Preferably, the IED 12A is capable of exchanging data packages with the IEDs 12B-12G, according to a broadcast or multicast communication protocol compliant with the IEC 61850 standard, in particular according to a GOOSE communication protocol.

The IED 12A comprises a control unit 122, which is preferably provided with a digital processing device, such as microprocessor.

Advantageously, the IED 12A is an electronic device that is configured, so as to be compliant with the IEC 61850 standard.

The IED 12A comprises a memory location 122 where it is stored a configuration description file (e.g. a SCL file) 124 that describes the operative functionalities of the IED 12A, (e.g. by means of a standard SCL language).

The present invention will now be described for the sake of simplicity with reference to the case in which the configuration description files are SCL files. This choice is not to be intended as a limitation of the scope of the present invention. The configuration description files, such as the file 124, may be other kind of files different from SCL files.

The SCL file 124 comprises a section, in which it is stored a communication description data set 1240, which comprises information describing the communication capabilities of the IED 12A.

The communication description data set 1240 advantageously includes information related to the logical configuration of the communication network 11, in particular to the logical power/data flow between the IED 12A and the further IEDs 12B-12G.

The communication description data set 1240 may also include other data, such as for example, the MAC address lists to be used for the transmission/reception of GOOSE data packages, data related to the GOOSE massaging traffic, and the like.

The configuration module 1 comprises computerized means for automatically configuring the communication capabilities of an IED 12A.

Within the framework of the present invention, the term "computerized means" relates to software modules, routines and/or instructions that are stored or up-loaded and can be executed by a microcontroller or another digital processing device.

According to the invention, the configuration module 1 comprises first computerised means 1A that are configured to obtain first data $DATA_1$ indicative of the logical power/data flow between the IEDs 12A-12G of the SA system.

In particular, the first $DATA_1$ are indicative of the logical power/data flow between the IED 12A and the most adjacent IEDs of the SA system 10.

The configuration module 1 comprises second computerised means 1B that are configured to generate a new configuration description file (e.g. a new SCL file) $124_{NEW}$ for the Intelligent Electronic Device 12A on the base of the first data $DATA_1$, so acquired.

The new SCL file $124_{NEW}$ comprises a communication description data set $1240_{NEW}$ including information, which has been generated on the base of the first data $DATA_1$ to describe the logical power/data flow between the Intelligent Electronic Device 12A and the further Intelligent Electronic Devices 12B-12G.

The configuration module 1 comprises third computerised means 1C that are configured to store the new SCL file $124_{NEW}$ in the Intelligent Electronic Device 12A, in particular in the memory location 123.

In this way, the new SCL file $124_{NEW}$ advantageously replaces the previously existing SCL file 124 of the Intelligent Electronic Device 12A in describing the operative functionalities of the IED 12A, in particular the communication capabilities of this latter.

The new SCL file $124_{NEW}$ is thus used by the IED 12A in substitution of the previously existing configuration description file 124.

The computerized module 1 is particularly useful when a change in the logical configuration of the communication network 11 occurs for any reasons, in particular due to a change in the physical layout of the power distribution network 100.

In FIGS. 1-2, schematic representations of a power distribution network 100, in which a change in the physical configuration occur, are shown.

As it may be appreciated, the change in the physical layout involved the IEDs 12A-12E.

According to the physical layout shown in FIG. 1, the IED 12A occupies the generic position X and the IEDs 12B, 12C occupy the respectively positions X−1 and X+1 in the logical configuration of the communication network 11.

Devices 12B, 12C are thus the most adjacent IEDs positioned upstream and downstream with respect to the IED 12A.

In order to intervene for isolating a fault, the IED 12A thus needs to receive blocking/consent messages from the IEDs 12B, 12C.

According to the physical layout of FIG. 2, the IEDs 12A occupies the generic position $X_{NEW}$ and the IEDs 12D, 12E occupy the respectively positions $X-1_{NEW}$ and $X+1_{NEW}$ in the new logical configuration of the communication network 11.

Devices 12D, 12E have thus become the most adjacent IEDs positioned upstream and downstream with respect to the IED 12A.

In order to intervene for isolating a fault, the IED 12A needs now to receive blocking/consent messages from the IEDs 12D, 12E.

The SCL file of the IED 12A must thus be re-configured to ensure that the IED 12A can acknowledge the most adjacent further IEDs and operate properly.

Subsequent to the change of the physical layout of the power distribution network 100, the configuration module 1 is activated.

The computerized means 1A acquire data $DATA_1$ indicative of the change of the communication network, in particular of the change in the logical power/data flow between the IED 12A and the further IEDs 12B-12E of the SA system 10, which are affected by said change of the physical layout.

On the base of the DATA1 so acquired, the computerized means 1B generate a new SCL file $124_{NEW}$, in which a communication description data set $1240_{NEW}$ includes information that describes the new logical power/data flow between the IED 12A and the further IEDs 12B-12E of the SA system 10.

The computerized means 1C store the new SCL file $124_{NEW}$ to replace the previously existing SCL file 124.

Thanks to the intervention of the configuration module 1, the IED 12A is provided with a new updated SCL file that takes into account the changes in the logical power/data flow of the communication network 11.

In this way, the IED 12A can always acknowledge the most adjacent further IEDs and properly operate since any possible arising discrepancies between the logical power/data flow described in the SCL file and the actual logical power/data flow of the communication network 11 are automatically corrected.

Preferably, the configuration module 1 is embedded in the Intelligent Electronic Device 12A.

Preferably, the configuration module 1 is stored as a computer program product in a memory location of the control unit 122 and it is executed by the microprocessor of said control unit.

As an alternative, the configuration module 1 may be a physical device (such as an electronic circuit) that is integrated or operatively associated with the control unit 122.

The computerized means 1A may be configured to acquire the first data $DATA_1$ from a Human Machine Interface 121 comprised in the IED 12A.

The computerized means 1A may be also configured to acquire the first data $DATA_1$ from any device of the SA system 10, for example the automation device 13. In this case, the data $DATA_1$ may downloaded to the IED 12A via the communication network 12.

The computerized means 1A may be also configured to obtain the first data $DATA_1$ from second data $DATA_2$ acquired from the further IEDs that are adjacent to the IED 12A, e.g. from the IEDs 12B-12E of FIG. 2.

In this case, the computerized means 1A advantageously interrogate one or more of said adjacent IEDs 12B-12E, via the communication network 11.

Then, the computerized means 1A acquire from these latter second data $DATA_2$ comprised in their communication description data set of the SCL file.

The data $DATA_2$ may include information related to the identity of said adjacent IEDs 12B-12E and information related to their positions in the logical power/data flow of the communication network 11.

Once the data $DATA_2$ have been acquired, the computerized means 1A obtain the first data $DATA_1$ by processing the data $DATA_2$, so acquired.

The configuration module 1 may be also embedded in an automation device 13 of the SA system 10, e.g. in a control platform capable of providing communication gateway, control and/or user-interface functionalities or in a control server configured to provide control/coordination functionalities.

Preferably, the configuration module 1 is stored as a computer program product in a memory location of the control unit (not shown) of the automation device 13 and it is executed by a digital processing device of said control unit.

As an alternative, the configuration module 1 may be a physical device (such as an electronic circuit) that is integrated or operatively associated with the control unit of the automation device 13.

In this case, the computerized means 1A may be configured to acquire the first data $DATA_1$ from a Human Machine Interface 131 comprised in the automation device 13.

The computerized means 1A may be also configured to acquire third data $DATA_3$, which are indicative of the topology of the power distribution network from a supervisory system 14 (e.g. a SCADA system) or from a control and management system that is operatively associated with the SA system 10, and to obtain the first data $DATA_1$ by processing the data $DATA_3$, so acquired.

If the computerized module 1 is embedded in the in an automation devices 12, the computerized means 1C are advantageously configured to download the SCL file 124$_{NEW}$ into the IED 12A, so that the SCL file 124$_{NEW}$ is stored in the memory location 123 to replace the already existing SCL file 124.

The present invention has been described with reference to the IED 12A for the sole sake of simplicity.

Of course, other IEDs of the SA system 10 (such as the IED 12E), in particular those affected by the change of the logical configuration of the communication network 11, may be arranged to operate as the IED 12A.

The configuration module 1, according to the present invention, provides relevant advantages. The IEDs can be easily and automatically re-configured subsequent to any change in the physical layout of the power distribution network 100.

This allows to remarkably simplify the management of the SA system 10, with relevant advantages in terms of reduction of the maintenance costs.

The flexibility of use of the SA system 10 is remarkably increased since any changes in the logical configuration of the communication network may be automatically managed in a quick and effective way, without of the need of the intervention of the technical personnel.

The probability of errors or mistakes while re-configuring the IEDs is dramatically reduced since the re-configuration process is carried out in an automatic manner.

The configuration module 1 can be easily implemented as a computer program product to be stored in a storing medium (e.g. a memory location of the IED) or as a physical device (e.g. an electronic circuit) to be integrated in a control unit of an IED or automation device of the SA system 10.

The configuration module 1 is thus of relatively easy and cost-effective implementation at industrial level and practical implementation on the field.

The invention claimed is:

1. A configuration module for automatically configuring the communication capabilities of an Intelligent Electronic Device of a Substation Automation system for an electric power distribution network, said Electronic Device being capable of exchanging data packages with one or more further Intelligent Electronic Devices of said Substation Automation system through a communication network of said Substation Automation system, characterized in that it comprises: first computerized means configured, responsive to a change in a physical layout of the power distribution network, to obtain first data indicative of a corresponding change in a logical power and data flow between said Intelligent Electronic Device and a one or more of said further Intelligent Electronic Devices immediately positioned upstream and downstream with respect to said Intelligent Electronic Device in the logical power and data flow; second computerized means configured to generate a configuration description file for said Intelligent Electronic Device on the base of said first data, said configuration description the comprising a communication description data set including information, which has been generated on the base of said first data to describe the change in the logical power and data flow between said Intelligent Electronic Device and said further intelligent Electronic Devices; third computerized means configured to store said configuration description the in said Intelligent Electronic Device to replace a previously existing configuration description the for said Intelligent Electronic Device, wherein said Intelligent Electronic Device is configured to distinguish or acknowledge messages transmitted by the one or more of said further Intelligent Electronic Devices immediately positioned upstream and downstream with respect to said Intelligent Electronic Device in the logical power and data flow, based on said communication description data set in said stored configuration description file.

2. A configuration module, according to claim 1, characterized in that said Intelligent Electronic Device is capable of exchanging data packages with said further Intelligent Electronic Devices, according to a broadcast or multicast communication protocol compliant with the IEC 61850 standard.

3. A configuration module, according to claim 2, characterized in that said Intelligent Electronic Device is capable of exchanging data packages with said further Intelligent Electronic Devices, according to a GOOSE communication protocol.

4. A configuration module, according to claim 1, characterized in that it is embedded in said Intelligent Electronic Device.

5. A configuration module, according to claim 4, characterized in that said first computerized means are configured to acquire said first data from a Human Machine Interface of said Intelligent Electronic Device.

6. A configuration module, according to claim 5, characterized in that said first computerized means are configured to acquire said first data from a device of said Substation Automation system.

7. A configuration module, according to claim 6, characterized in that said first computerized means are configured to: interrogate one or more further Intelligent Electronic Devices that are adjacent to said Intelligent Electronic Device; and acquire second data comprised in a communication description data set of a SCL the of said interrogated further Intelligent Electronic Devices; obtain said first data from said second data.

8. A configuration module, according to claim 1, characterized in that it is embedded in an automation device of said Substation Automation system.

9. A configuration module, according to claim 8, characterized in that said first computerized means are configured to acquire said first data from a Human Machine Interface of said automation device.

10. A configuration module, according to claim 9, characterized in that said first computerized means are configured to acquire third data (DATA3), indicative of the topology of said power distribution network from a supervisory system or control and management system, which is operatively associated with said Substation Automation system, and are configured to obtain said first data from said third data.

11. A configuration module, according to claim 10, characterized in that said third computerized means are configured to download said configuration description file into said Intelligent Electronic Device.

12. A control unit for automatically configuring the communication capabilities of a first secondary device of a substation automation system for an electric power distribution network, the first secondary device configured to exchange data packages with one or more further secondary devices of the substation automation system through a communication network of the substation automation system, the respective secondary devices further configured to manage operation of one or more operatively associated primary devices of the power distribution network, the control unit comprising:
a digital processing device; and
a storage medium comprising a computer program product configured upon execution by the digital processing device to direct the performance of operations comprising:
responsive to a change in topology for the power distribution network, automatically obtaining first data indicative of a corresponding change in logical power and data flow between the first secondary device and a one or more of the further one or more secondary devices immediately positioned upstream and downstream with respect to the first secondary device in the logical power and data flow;
generating a configuration description file for the first secondary device based on the first data, the configuration description file comprising a communication description data set including information generated based on the first data to describe the change in the logical power and data flow between the first secondary device and the one or more further secondary devices; and
storing the generated configuration description file, wherein the generated configuration description file is used in substitution of a previously existing configuration description file for the first secondary device,
wherein the first secondary device is configured to distinguish or acknowledge messages transmitted by the one or more of the further one or more secondary devices immediately positioned upstream and downstream with respect to the first secondary device in the logical power and data flow, based on the communication description data set in the stored configuration description file.

13. The control unit of claim 12, wherein the first secondary device is configured to exchange data packages with the one or more further secondary devices according to a broadcast or multicast communication protocol compliant with the IEC 61850 standard.

14. The control unit of claim 13, wherein the first secondary device is configured to exchange data packages with the one or more further secondary devices according to a GOOSE communication protocol.

15. The control unit of claim 12, wherein the operation of automatically obtaining first data comprises acquiring the first data from a human machine interface of the first secondary device.

16. The control unit of claim 12, wherein the operation of automatically obtaining first data comprises acquiring the first data from an automation device of the substation automation system.

17. The control unit of claim 16, wherein the automation device is a control platform configured to provide any one or more of communication gateway, control or user-interface functionalities.

18. The control unit of claim 16, wherein the automation device is a server configured to provide any one or more of control or coordination functionalities for the first secondary device and the one or more further secondary devices.

19. The control unit of claim 12, wherein the operation of automatically obtaining first data comprises:
interrogating one or more further secondary devices that are adjacent to the first secondary device;
acquiring second data comprised in a communication description data set of an SCL file of the interrogated further secondary devices; and
obtaining the first data from the second data.

20. The control unit of claim 12, wherein the operation of automatically obtaining first data comprises acquiring the first data from a human machine interface of an automation device of the substation automation system.

21. The control unit of claim 12, wherein the operation of automatically obtaining first data comprises acquiring third data indicative of the topology of the power distribution network from a supervisory system operatively associated with the substation automation system, and obtaining the first data from the third data.

22. The control unit of claim 12, wherein the operation of automatically obtaining first data comprises acquiring third data indicative of the topology of the power distribution network from a control and management system operatively associated with the substation automation system, and obtaining first data from the third data.

23. The control unit of claim 22, wherein the operation of storing the generated configuration description file comprises downloading the configuration description file into the first secondary device.

24. A substation automation system comprising:
one or more primary devices for an electric power distribution network;
a first secondary device configured to exchange data packages with one or more further secondary devices through a communication network, the first secondary device and the further secondary devices each configured to manage operation of operatively associated primary devices; and
wherein the first secondary device further comprises a control unit configured to, responsive to a change in topology for the power distribution network,
automatically obtain first data indicative of a corresponding change in a logical power and data flow between the first secondary device and a one or more of the further one or more secondary devices immediately positioned upstream and downstream with respect to the first secondary device in the logical power and data flow,
generate a configuration description file for the first secondary device based on the first data, the configuration description file comprising a communication description data set including information generated based on the first data to describe the change in the logical power and data flow between the first secondary device and the one or more further secondary devices, and
store the generated configuration description file, wherein the generated configuration description file is used in substitution of a previously existing configuration description file for the first secondary device,
wherein the first secondary device is configured to distinguish or acknowledge messages transmitted by the one or more of the further one or more secondary devices immediately positioned upstream and downstream with respect to the first secondary device in the logical power and data flow, based on the communication description data set in the stored configuration description file.

25. The system of claim 24, the control unit comprising a digital processing device and a storage medium comprising a computer program product executable by the digital processing device.

26. The system of claim 24, comprising an electronic circuit integrated or operatively associated with the control unit, the electronic circuit activated subsequent to the change in topology for the power distribution network.

27. A substation automation system comprising:
one or more primary devices for an electric power distribution network;
a first secondary device configured to exchange data packages with one or more further secondary devices through a communication network, the first secondary device and the further secondary devices each configured to manage operation of operatively associated primary devices; and
an automation device further comprising a control unit configured to, responsive to a change in topology for the power distribution network,
automatically obtain first data indicative of a corresponding change in a logical power and data flow between the first secondary device and a one or more of the further one or more secondary devices immediately positioned upstream and downstream with respect to the first secondary device in the logical power and data flow,
generate a configuration description file for the first secondary device based on the first data, the configuration description file comprising a communication description data set including information generated based on the first data to describe the change in the logical power and data flow between the first secondary device and the one or more further secondary devices, and
store the generated configuration description file, wherein the generated configuration description file is used in substitution of a previously existing configuration description file for the first secondary device,
wherein the first secondary device is configured to distinguish or acknowledge messages transmitted by the one or more of the further one or more secondary devices immediately positioned upstream and downstream with respect to the first secondary device in the logical power and data flow, based on the communication description data set in the stored configuration description file.

28. The system of claim 27, the control unit comprising a digital processing device and a storage medium comprising a computer program product executable by the digital processing device.

29. The system of claim 27, comprising an electronic circuit integrated or operatively associated with the control unit, the electronic circuit activated subsequent to the change in topology for the power distribution network.

30. The system of claim 27, wherein the automation device is a control platform configured to provide any one or more of communication gateway, control or user-interface functionalities.

31. The control unit of claim 27, wherein the automation device is a server configured to provide any one or more of control or coordination functionalities for the first secondary device and the one or more further secondary devices.

* * * * *